United States Patent
DiGiacomo et al.

(10) Patent No.: US 6,447,007 B1
(45) Date of Patent: Sep. 10, 2002

(54) COMPACT DUAL NOZZLE AIR BAG INFLATOR

(75) Inventors: Michael DiGiacomo, Warrenton; Robert E. Black, Centerville; Chester A Copperthite, Summerduck; Mark S. Derstine, Bristow, all of VA (US); Robert Rovito, Knoxville, TN (US)

(73) Assignee: Atlantic Research Corporation, Gainesville, VA (US)

( * ) Notice: Subject to any disclaimer, the term of this patent is extended or adjusted under 35 U.S.C. 154(b) by 0 days.

(21) Appl. No.: 09/536,406

(22) Filed: Mar. 28, 2000

(51) Int. Cl.[7] ............................................... B60R 21/26
(52) U.S. Cl. ....................................... 280/741; 280/736
(58) Field of Search ............................... 280/736, 737, 280/741, 742

(56) References Cited

U.S. PATENT DOCUMENTS

| | | | |
|---|---|---|---|
| 5,364,126 A | | 11/1994 | Kuretake et al. |
| 5,582,428 A | | 12/1996 | Buchanan et al. |
| 5,622,380 A | * | 4/1997 | Khandhadia et al. ........ 280/736 |
| 5,669,631 A | | 9/1997 | Johnson et al. |
| 5,685,558 A | | 11/1997 | Cuevas |
| 5,690,357 A | | 11/1997 | Cuevas |
| 5,762,368 A | | 6/1998 | Faigle et al. |
| 5,803,494 A | | 9/1998 | Headley |
| 5,851,027 A | * | 12/1998 | DiGiacomo et al. ........ 280/736 |
| 5,907,120 A | | 5/1999 | Mooney et al. |
| 5,984,352 A | * | 11/1999 | Green, Jr. et al. ........... 280/736 |
| 6,032,979 A | * | 3/2000 | Mossi et al. ................. 280/741 |
| 6,050,599 A | * | 4/2000 | Marsaud et al. ............. 280/736 |
| 6,068,291 A | * | 5/2000 | Lebaudy et al. ............. 280/736 |
| 6,142,515 A | * | 11/2000 | Mika ........................... 280/736 |
| 6,189,927 B1 | * | 2/2001 | Mossi et al. ................. 280/741 |
| 6,213,503 B1 | * | 4/2001 | Zimbrich et al. ............ 280/736 |
| 6,286,863 B1 | * | 9/2001 | Kamiji et al. ................ 280/736 |

* cited by examiner

*Primary Examiner*—Paul N. Dickson
*Assistant Examiner*—L. Lum
(74) *Attorney, Agent, or Firm*—Nixon & Vanderhye, P.C.; Frank P. Presta

(57) ABSTRACT

A multi-level output inflator for inflating an airbag in the event of a vehicle crash, comprising a housing, a wall section disposed in the housing to define separate primary and secondary combustion chambers therein. A primary initiator and primary propellant are disposed within the primary combustion chamber, and a secondary initiator and secondary propellant are disposed with the secondary combustion chamber. The housing comprises a primary nozzle in communication with the primary combustion chamber, and a secondary nozzle in communication with the secondary combustion chamber. The primary and secondary initiators may be fired separately, simultaneously, or in a timed sequence to inflate the air bag at different rates and levels depending on the nature of the vehicle crash. A method of assembling the components of the inflator is also described and covered.

11 Claims, 7 Drawing Sheets

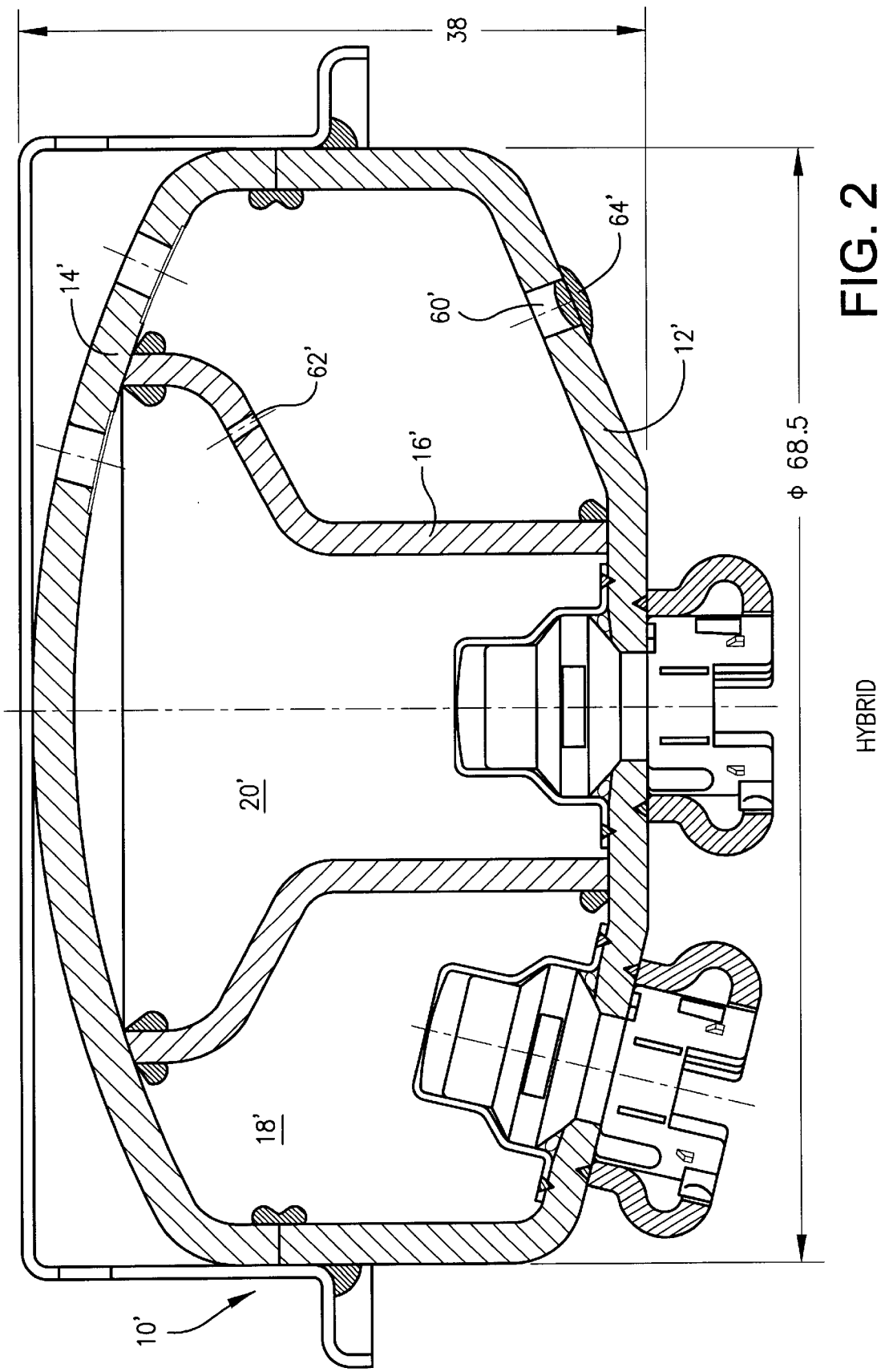

STEP 1:
— PRESS INITIATORS INTO BOTTOM VESSEL

STEP 2:
– FRICTION WELD CENTER POST
TO BOTTOM VESSEL

STEP 3:
- POUR PROPELLANT GRAINS INTO PRIMARY AND SECONDARY CHAMBERS

STEP 4:
— FRICTION WELD TOP TO CENTER POST AND BOTTOM VESSEL SIMULTANEOUSLY

STEP 5:
- REMOVE WELD FLASH FROM THE OUTER SURFACE ON THE TOP PRESSURE VESSEL
- PLACE SCREEN INSIDE DIFFUSER THEN WELD DIFFUSER ONTO TOP PRESSURE VESSEL

COMPACT DUAL NOZZLE AIR BAG INFLATOR

BACKGROUND OF THE INVENTION

1. Field of the Invention

The present invention relates generally to an inflator for an air bag or the like and, more specifically, to a compact dual nozzle inflator which can selectively release gas at different rates and levels and thus enable an air bag to be deployed at different output levels in accordance with different sensor inputs.

2. Description of the Related Art

Recently, there has been a demand for controlling the rate and amount of inflation of safety devices such as air bag restraint systems in accordance with variables such as passenger size, position, seat belt usage and the velocity of a vehicle at the time of collision.

In order to provide optimal occupant protection, different levels of output are required from the airbag inflator. For example, in a high speed collision with a large belted person, full rapid inflation of the air bag is required to provide the best restraint. In lower speed crashes with smaller sized occupants or even out-of-position position occupants, a lower, slower rate of inflation is required so as not to inadvertently injure the occupant but still provide enough inflation to effect appropriate restraint.

In currently available air bag inflators intended for dual level or variable output function, the performance is accomplished primarily with inflators which are made up of two individual inflators sharing one diffuser, or by individual propellant chambers in a common pressure vessel sharing one common nozzle.

Utilizing two separate inflators results in large, heavy and expensive designs since nearly every component is duplicated. For example, there are two distinct pressure vessels, with redundant closures, seals, and in some cases diffusers. Additionally, there is the added requirement of securing the two inflators to a common platform, which in turn increases cost, weight, and complexity in manufacturing. One advantage of such a design is the ability to operate separate nozzles for each of the two inflators. This provides flexibility in functioning the inflators at different times, depending on the output level required, with much more predictable and repeatable performance. Each nozzle is optimized for the specific propellant configuration present in the respective gas generator. One propellant with different geometry, burn rate, and formulation could be used independent of the other to tailor and optimize the inflator performance.

The second approach of having separate propellant chambers encapsulated in one common pressure vessel results in more efficient packaging, and reduced cost if the components are shared by the two propellant charges. However, the primary disadvantage of such construction is that they typically share one common nozzle for all inflator output configurations. For example, a high output inflator deployment requiring simultaneous combustion of both propellant chambers will discharge all of inflator gases from one nozzle geometry. This nozzle is typically optimized for the maximum output condition in order to keep operating pressures within design limits.

Depending on the vehicle crash scenario, a deployment condition requiring something less than full output, i.e., a staggered combustion of the two propellant charges, or combustion of just one apropellant charge, may be initiated. Since the nozzle has been optimized for full output, this reduced output performance will be less than optimum, owing to lower combustion pressure often resulting in poor repeatability, especially across the temperature range. The flexibility to accommodate a wide range of performances with a single nozzle becomes very limited. The problem is further exacerbated with the usage of pressure sensitive, "high slope" propellants such as those based on ammonium nitrate formulations.

Consequently, there is a need for a cost-effective, light-weight, compact, simple multi-level inflator for air bags and the like. This need is met by the new and improved inflator of the present invention.

SUMMARY OF THE INVENTION

It is an object of the present invention, therefore, to overcome the disadvantages of the prior art and to provide a cost-effective, light-weight, compact and simple multi-level inflator device which is reliable in operation.

A further object of the present invention is to provide a multi-level inflator with two gas generators, which permits ignition of the generators either separately, simultaneously or in a timed sequence to effect air bag inflation at different rates in accordance with sensor inputs resulting from a crash or the like.

It is a further object of the present invention to provide a multi-level inflator which utilizes a common pressure vessel to provide two separate and distinct propellant chambers with completely independent ignitors and nozzles.

It is an additional object of the present invention to provide such a multi-level inflator which may be of the pyro or hybrid type.

Still another object of the present invention is to provide such a multi-level inflator which is simple in construction and easy to assemble to minimize the cost and size of the assembly.

These and other objects of the present invention are achieved by providing a multi-level inflation device for inflating a vehicle safety restraint such as an air bag comprising a common pressure vessel which is constructed to provide two separate and distinct propellant chambers with independent ignitors. The combustion gases do not communicate between the chambers so that they perform as "separate" inflators which maintaining the size and weight of a comparable single stage inflator. The gases exit from separate nozzles in each chamber into a common diffuser and screen assembly to minimize redundant components. The inflator can be configured as either a variable output pyro inflator or a variable output hybrid inflator with essentially the same components.

BRIEF DESCRIPTION OF THE DRAWINGS

FIG. 2 is a side elevational view in section of a second embodiment of the multi-level inflator of the present invention.

DESCRIPTION OF THE PREFERRED EMBODIMENTS

Figure 1:
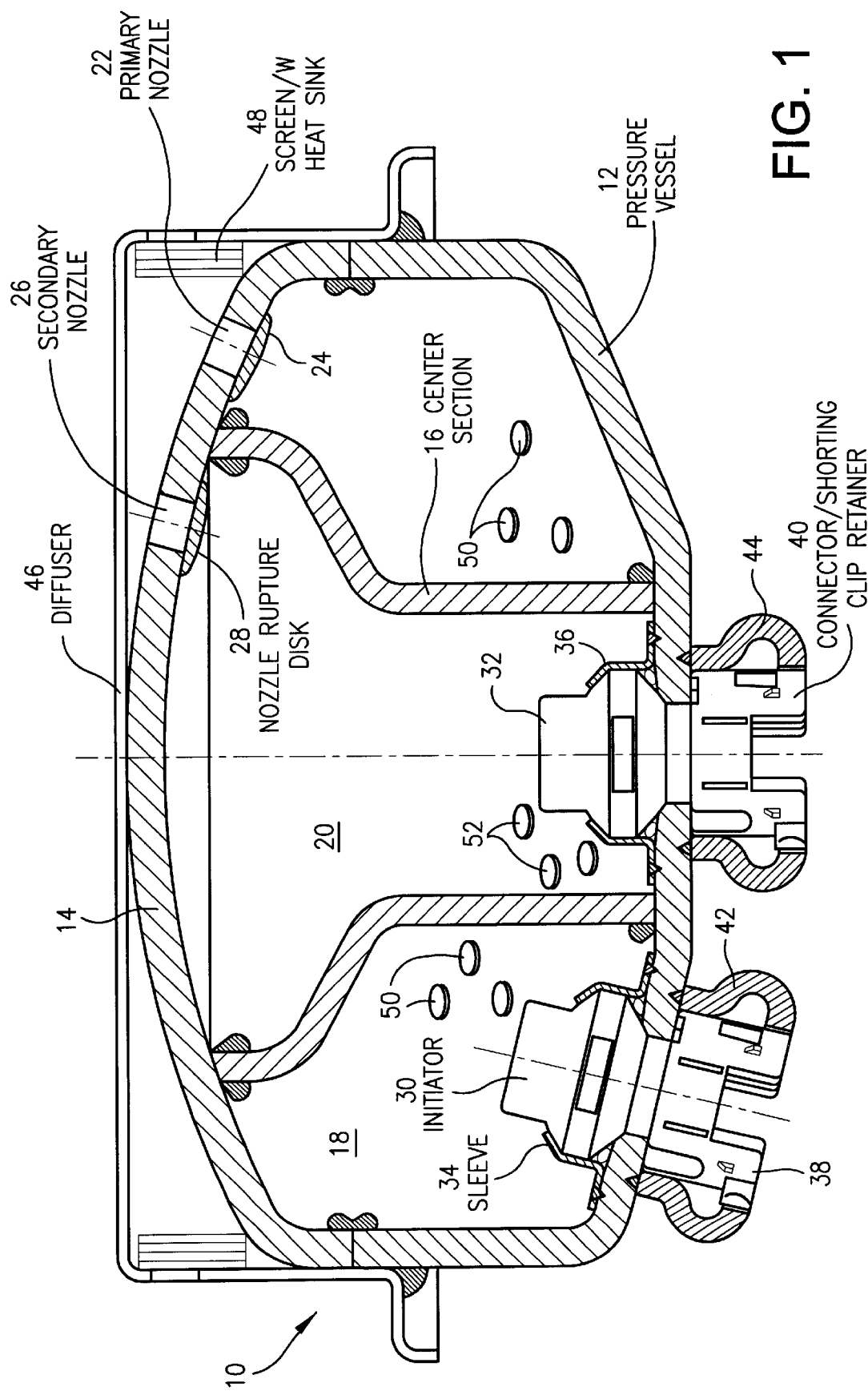
FIG. 1 is a side elevational view in section of a first embodiment of the multi-level inflator of the present invention.

FIG. 1 illustrates the first embodiment of the air bag inflator 10 of the present invention of the all-pyro or direct inflation type. The inflator 10 generally comprises a bottom housing or pressure vessel section 12, an upper housing or pressure vessel section 14 connected to the bottom section 12, and a center or wall section 16 connected to the top and bottom sections 12 and 14 to define a primary combustion chamber 18 and a secondary combustion chamber 20 that are separate from each other.

The upper housing section 14 comprises a primary nozzle 22 and primary rupture disk 24 adjacent the primary combustion chamber, and a secondary nozzle 26 and secondary rupture disk 28 adjacent the secondary combustion chamber 20. A primary initiator 30 is mounted on the bottom housing section 12 and is disposed in the primary combustion chamber 18. Similarly, a secondary initiator 32 is mounted on the bottom housing section 12 and is disposed in the secondary combustion chamber 20. The initiators 30, 32 are connected to the bottom housing section 12 in any suitable manner, such as by sleeves 34, 36, respectively. Primary and secondary initiator connectors or shorting clips, 38, 40 of any suitable construction, are connected to the bottom of the bottom housing section 12 in any suitable manner, such as by retainers 40, 42, respectively.

A diffuser 46 is mounted over the upper housing section 14 and is secured thereto or to the lower housing section 12. A screen/heat sink 48 may be mounted within the diffuser 46. The diffuser 46 and screen/heat sink 48 may be of any suitable construction.

A suitable primary propellant 50 is disposed within the primary combustion chamber 18 in pellet form or in any other desired form. Similarly, a suitable secondary propellant 52 is disposed in the secondary combustion chamber 20 in pellet form or in any other desired form. The primary and secondary propellants 50, 52, may be the same or may be different, depending on the desired operation of the inflator 10.

In the operation of the inflator 10, upon the sensing of a vehicle crash or the like, the primary initiator 30 and/or secondary initiator 32 will be fired to ignite the primary propellant 50 and/or the secondary propellant 52 to generate gas under pressure in the primary combustion chamber 18 and/or secondary combustion chamber 20, respectively. When the gas pressure in the primary combustion chamber 18 exceeds a predetermined value, the primary rupture disk 24 is ruptured to effect a gas flow through the primary nozzle 22 and the diffuser 46 to inflate the air bag (not shown) connected to the diffuser. Similarly, when the gas pressure in the secondary combustion chamber 20 exceeds a predetermined value, the secondary rupture disk 28 is ruptured to effect gas flow through the secondary nozzle 26 and the diffuser 46 to inflate the air bag (not shown) connected to the diffuser.

Depending on the nature of the vehicle crash and other variables such as passenger size and position, only the primary initiator 30 may be fired, only the secondary initiator 32 may be fired, or the primary and secondary initiators 30, 32 may be fired simultaneously or in a timed sequence to establish different rates and levels of inflation of the air bag.

It will be noted that the inflator 10 is compact, simple in construction and thus low in weight. It utilizes a common housing or pressure vessel 12, 14 to provide two separate and distinct combustion chambers 18 and 20 with completely independent nozzles 22 and 26, respectively. The combustion gases do not communicate between the primary combustion chamber 18 and secondary combustion chamber 20, thereby providing "separate" inflators while maintaining the size and weight of a comparable single stage inflator. By having the gases exit from the separate nozzles 22, 26 into a common diffuser 46 and screen/heat sink 48, the redundant components are minimized.

As an illustrative example, the housing or pressure vessel 12, 14 and the center section 16 preferably are formed of a suitable metal such as steel or aluminum and are connected together in any suitable manner such as by welding or the like. Because of its simple construction and minimum number of parts, the inflator 10 can be fabricated easily and quickly in the manner shown in FIGS. 3A–3E.

Figure 3A:
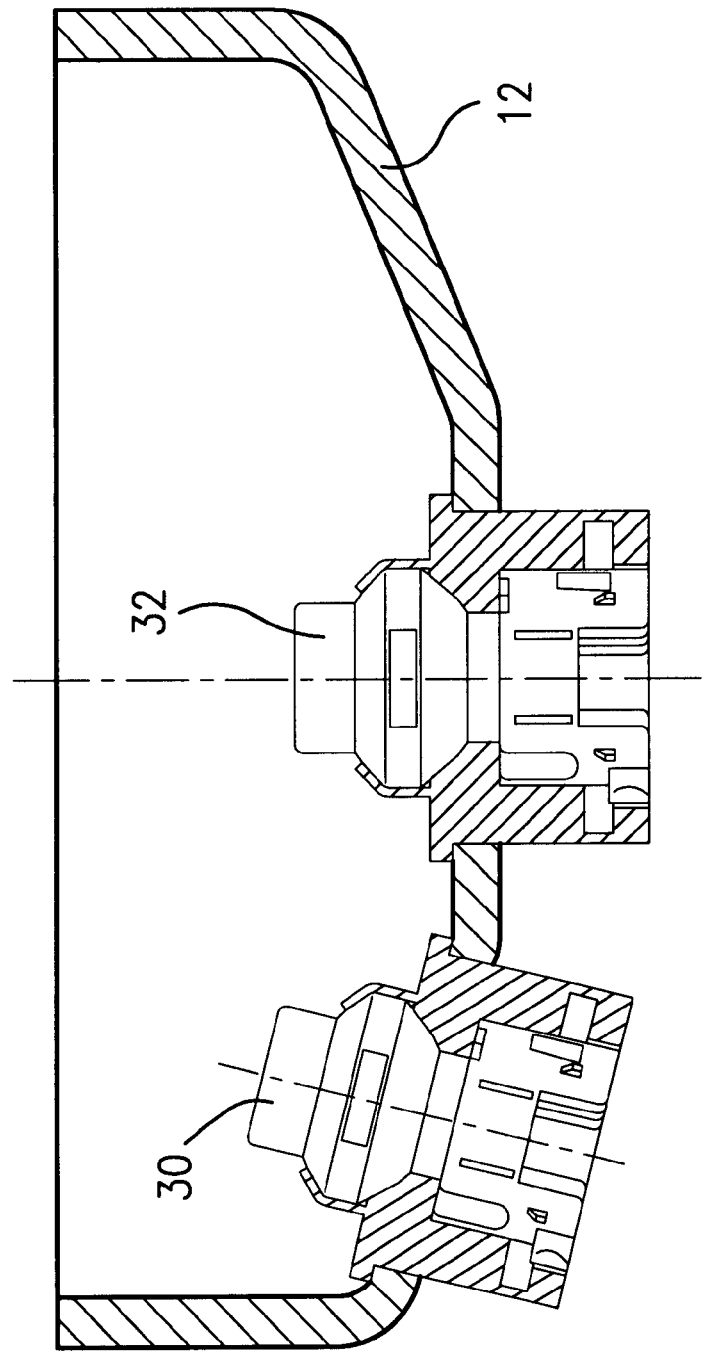
FIGS. 3A–3E are side elevational views in section of the components of the multi-level inflator of the present invention in different stages of assembly.
Figure 3B:
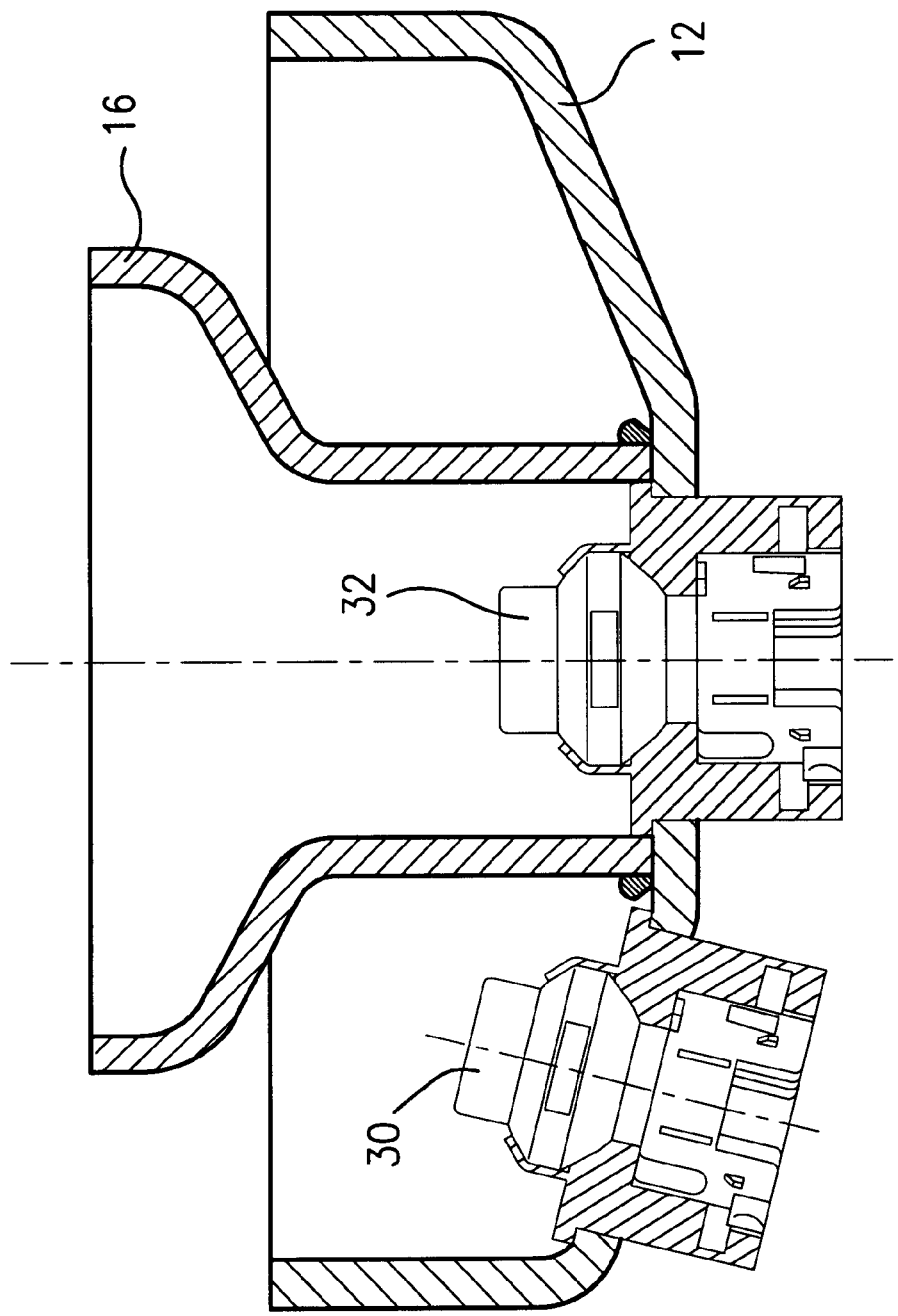
Figure 3C:
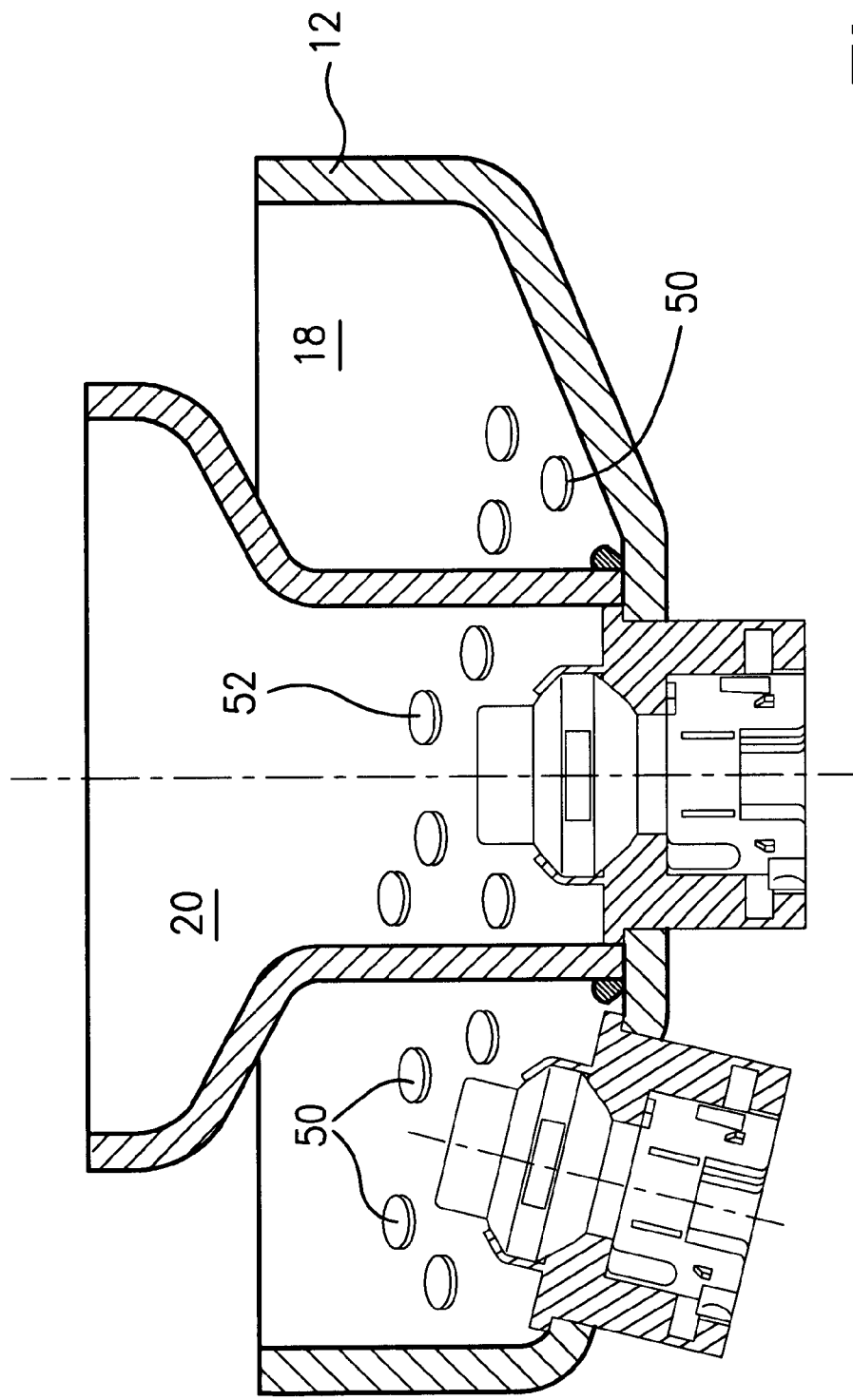

As a first step, the primary and secondary initiators 30, 32 are mounted on the lower housing section 12 as shown in FIG. 3A. Thereafter, the center section 16 is positioned within and secured to the bottom housing section 12 to separate the primary and secondary ignitors, as shown in FIG. 3B. As a third step, the primary and secondary propellants 50, 52 are positioned within the primary and secondary combustion chambers 18, 20, respectively, as shown in FIG. 3C.

Figure 3D:
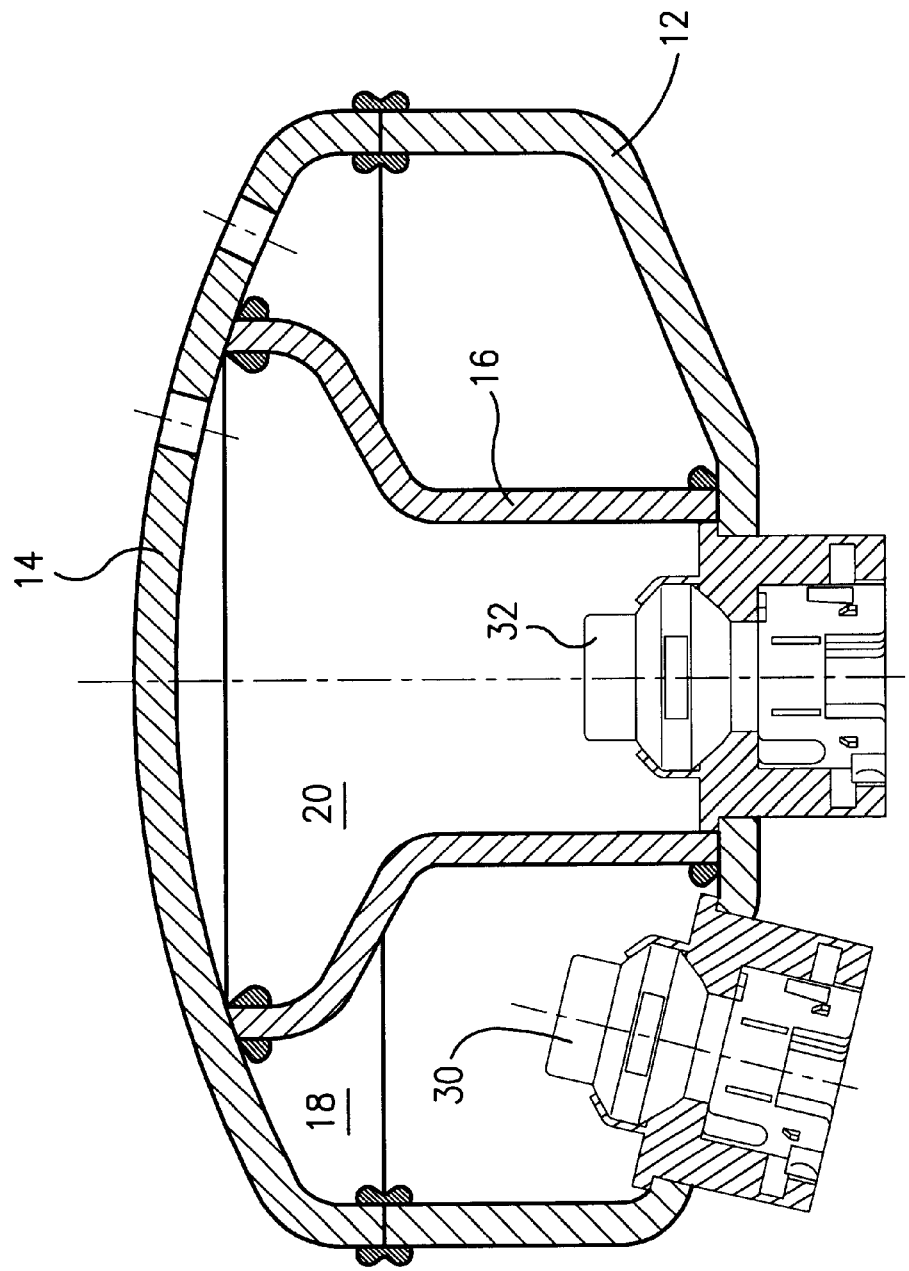
Figure 3E:
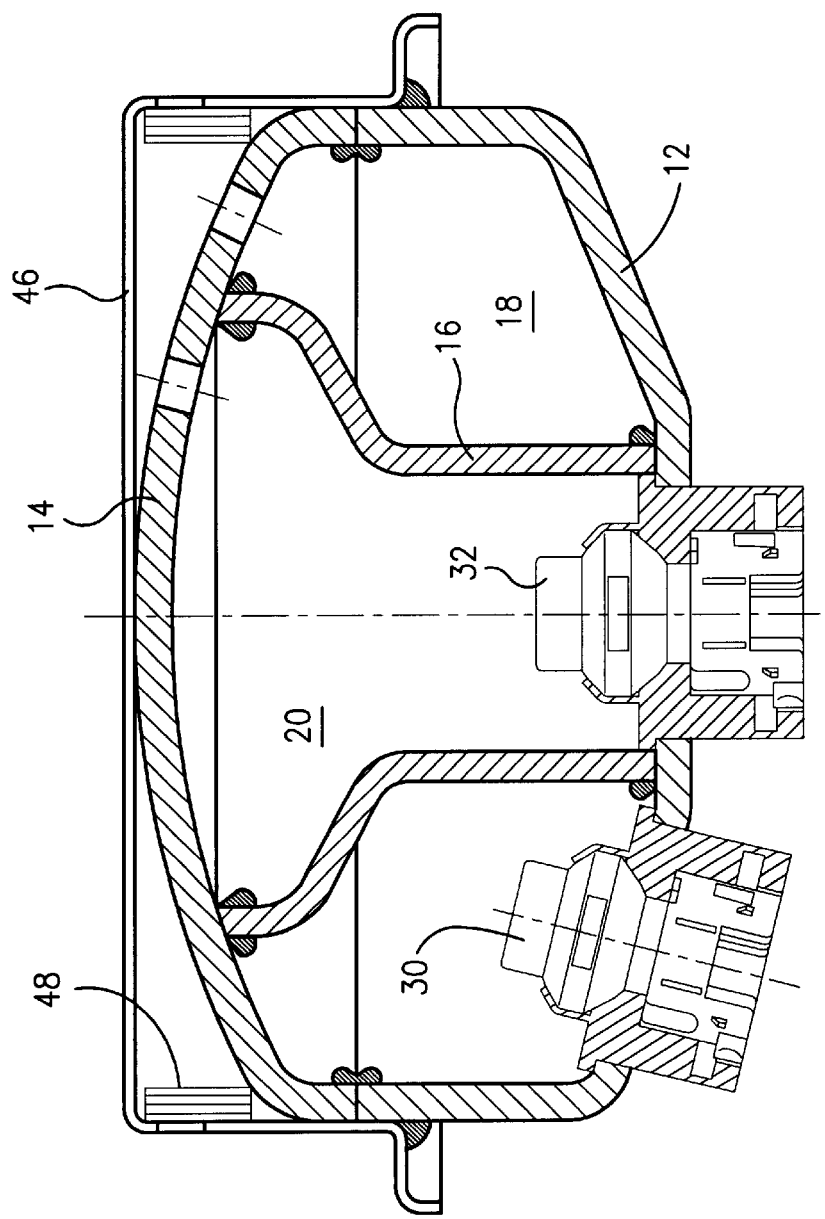

In the next step, the upper housing section 14 is positioned over and connected to the upper portions of the bottom housing section 12 and center section 16 as shown in FIG. 3D. Thereafter, the diffuser 46 and screen/heat sink 48 are mounted over and secured to the housing 12, 14, as shown in FIG. 3E.

FIG. 2 discloses a second embodiment of an inflator 10' of the present invention which is of the hybrid type wherein an inert gas under pressure, such as argon, is stored in the primary and secondary combustion chambers 18' and 20'. The construction and operation of the hybrid inflator 10' are substantially the same as that of the all pyro inflator 10 shown in FIG. 1, with the exception of the differences described hereinafter.

As shown in FIG. 2, the lower housing section 12' is provided with fill hole 60' for introducing the inert gas under pressure into the primary combustion chamber 18' and, through the bleed hole 62' in the center section 16', into the secondary combustion chamber 20'. The hole 60' in lower housing section 12' is closed by a plug 64' of any suitable construction. In the operation of the hybrid inflator 10', the bleed hole 62' is sufficiently small to minimize the flow of pressurized inflation gas generated by the ignition of the primary and secondary propellants between the primary and secondary combustion chambers 18' and 20'.

The inflators 10 and 10' may be of any suitable size and shape. Preferably, the housing or pressure vessel 12, 14 or 12', 14' and the center section 16, 16' are generally cylindrical, and the upper portion of the central section extends upwardly and outwardly for strength purposes and also to define an appropriately large secondary combustion chamber 20'. Because of the inert gas stored under pressure in the hybrid inflator 10', the components thereof may be somewhat heavier in construction than those of the all pyro inflator 10.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A multi-level output inflator for inflating an air bag in the event of a vehicle crash, comprising:

a housing;

a wall section disposed in said housing to define a primary combustion chamber and a secondary combustion chamber therein that are separate from each other;

a primary initiator and primary propellant disposed within said primary combustion chamber;

a secondary initiator and secondary propellant disposed within said secondary combustion chamber;

a primary nozzle in said housing in communication with said primary combustion chamber for directing combustion gas from said primary combustion chamber to the air bag; and a secondary nozzle in said housing in communication with said secondary combustion chamber for directing combustion gas from said secondary combustion chamber to the air bag independently of said primary nozzle and said primary combustion chamber;

whereby said primary initiator and said secondary initiator are fired separately, simultaneously or in a timed sequence to inflate the air bag at different rates and levels depending on the nature of the vehicle crash;

said wall section being a center section of generally cylindrical shape which defines a substantially cylindrical secondary combustion chamber surrounded by an annular primary combustion chamber, an upper portion of said center section extending outwardly and upwardly.

2. The inflator of claim 1 further comprising a primary rupture disk mounted in said housing over said primary nozzle, and a secondary rupture disk mounted in said housing over said secondary nozzle, said primary and secondary rupture disks being constructed to rupture at predetermined gas pressures in said primary and secondary combustion chambers.

3. The inflator of claim 1 wherein said housing comprises an upper section and a lower section connected together, said primary and secondary initiators being mounted on said lower housing section, and said primary and secondary nozzles being disposed in said upper housing section.

4. The inflator of claim 3 wherein said wall section is a generally cylindrical center section having its upper end connected to said upper housing section and its lower end connected to said lower housing section to define a generally cylindrical secondary combustion chamber and a generally annular primary combustion chamber surrounding said secondary combustion chamber.

5. The inflator of claim 1 wherein a diffuser is mounted on said housing near said primary and secondary nozzles.

6. The inflator of claim 5 wherein a screen and heat sink are mounted within said diffuser.

7. The inflator of claim 1 wherein a hole is provided in said housing for enabling a pressurized inert gas to be introduced into said primary combustion chamber, and a bleed hole is located in said wall section to enable said pressurized gas to enter said secondary combustion chamber at a slow rate.

8. The inflator of claim 3 wherein a plug is mounted on said housing to close said hole after the pressurized inert gas is introduced therein.

9. A method of assembling a multi-level output air bag inflator having a lower housing section with an upstanding sidewall, an upper housing section and a generally cylindrical center section disposed within said upper and lower housing sections to define separate combustion chambers therein, comprising the steps of:

mounting primary and secondary initiators in spaced relation on said lower housing section;

positioning said center section within a center portion of said lower housing section and securing it thereto to separate said primary and secondary initiators and to define primary and secondary combustion chambers within the sidewall of said lower housing section; said primary combustion chamber being generally annular and surrounding said center section, and said secondary combustion chamber being disposed within said center section;

placing primary and secondary propellants in said primary and secondary combustion chambers;

positioning said upper housing section with primary and secondary nozzles therein over said lower housing section and said center section and securing it thereto with said primary nozzle being in communication with said primary combustion chamber and said secondary nozzle being in communication with said secondary combustion chamber.

10. The method of claim 9, further comprising the step of positioning a diffuser over said upper housing section adjacent said primary and secondary nozzles.

11. The method of claim 10 wherein said lower housing section, said central section, said upper housing section and said diffuser are formed of metal and are connected by welding.

* * * * *